(12) United States Patent
Kohiga

(10) Patent No.: US 8,180,930 B2
(45) Date of Patent: May 15, 2012

(54) INFORMATION PROCESSING DEVICE, AND DEVICE INITIALIZATION METHOD IN THE INFORMATION PROCESSING DEVICE

(75) Inventor: Akihito Kohiga, Tokyo (JP)

(73) Assignee: NEC Corporation, Tokyo (JP)

( * ) Notice: Subject to any disclaimer, the term of this patent is extended or adjusted under 35 U.S.C. 154(b) by 445 days.

(21) Appl. No.: 12/358,812

(22) Filed: Jan. 23, 2009

(65) Prior Publication Data

US 2009/0210565 A1    Aug. 20, 2009

(30) Foreign Application Priority Data

Feb. 14, 2008    (JP) ................................ 2008-032986

(51) Int. Cl.
*G06F 3/00* (2006.01)
*G06F 15/177* (2006.01)

(52) U.S. Cl. .................. 710/10; 710/8; 713/1; 713/2

(58) Field of Classification Search .................. None
See application file for complete search history.

(56) References Cited

U.S. PATENT DOCUMENTS

| | | | |
|---|---|---|---|
| 7,171,549 B2 * | 1/2007 | Machida et al. | 713/1 |
| 7,761,863 B2 * | 7/2010 | Illowsky et al. | 717/167 |
| 2002/0129233 A1 * | 9/2002 | Hillis et al. | 713/2 |
| 2005/0080956 A1 * | 4/2005 | Zaudtke et al. | 710/72 |
| 2006/0212550 A1 * | 9/2006 | Oda | 709/220 |
| 2008/0209198 A1 * | 8/2008 | Majni et al. | 713/2 |
| 2008/0229146 A1 * | 9/2008 | Arai | 714/13 |
| 2009/0113173 A1 * | 4/2009 | Jaffrey | 712/32 |
| 2009/0193179 A1 * | 7/2009 | Hiroyoshi | 711/103 |

FOREIGN PATENT DOCUMENTS

| | | |
|---|---|---|
| JP | 2003084981 A | 3/2003 |
| JP | 2005284491 A | 10/2005 |
| JP | 2006259903 A | 9/2006 |

OTHER PUBLICATIONS

Sugaya Seiichi, "Detailed Commentary of SCSI-2", CQ Publishing, Aug. 15, 2004, pp. 47-53.

* cited by examiner

*Primary Examiner* — Henry Tsai
*Assistant Examiner* — Michael Sun

(57) ABSTRACT

The information processing device of the present invention includes: an initialization unit that is realized by the execution of firmware for carrying out a first initialization process for enabling access from the firmware to devices that are connected to the information processing device; a control unit that is realized by operation of an OS for carrying out a second initialization process for enabling access to the devices from the OS; and a main memory unit; wherein the initialization unit includes a device initialization unit for setting the device control information that is necessary for accessing devices in the first initialization process and an initialization information storage unit for storing in the main memory unit initialization information that includes the device control information that was set by the device initialization unit, and where in the control unit includes a device information application unit for acquiring the initialization information of devices from the main memory unit in the second initialization process.

8 Claims, 16 Drawing Sheets

Fig.11

| device name | device A | device B | device C | device D | .... |

Fig.15

| leading address | final address | method of use |
|---|---|---|
| 0x00000000 | 0x0009FFFF | usable |
| 0x000F0000 | 0x000FFFFF | reserved |
| 0x00100000 | 0x07FEFFFF | usable |
| 0x07FF0000 | 0x07FF2FFF | ACPI data |
| 0x07FF3000 | 0x07FFFFFF | ACPI non-volatile memory |
| 0x80000000 | 0xFFFFFFFF | initialization information storage area |

INFORMATION PROCESSING DEVICE, AND DEVICE INITIALIZATION METHOD IN THE INFORMATION PROCESSING DEVICE

This application is based upon and claims the benefit of priority from Japanese patent application No. 2008-032986, filed on Feb. 14, 2008, the disclosure of which is incorporated herein in its entirety by reference.

BACKGROUND OF THE INVENTION

1. Field of the Invention

The present invention relates to an information processing device and to a device initialization method and device initialization program in the information process device, and more particularly relates to a technique for using initialization information acquired by the initialization process of a device that is executed by firmware before execution of the OS to omit a portion of the initialization process of the device carried out by the OS.

2. Description of the Related Art

Many devices such as hard disks, graphics cards, and network cards require that the initialization process of these devices be carried out in an information processing device to enable access from the information processing device.

The initialization process of a device in an information processing device involves setting the device in a state that allows access from the information processing device by recognizing the connection state of the device, allocating important resources such as I/O (input/output) port numbers and IRQ (Interrupt ReQuest) numbers, and setting register information in a register belonging to the device.

Recognizing the connection state of a device is a process of detecting the device that is connected to the information processing device and acquiring basic information such as the device name of the device that has been detected. The method of detecting a device differs according to the device.

The I/O port number is the identification number of a device that is assigned to each device from the information processing device.

IRQ is an electrical signal by which a device notifies the CPU (Central Processing Unit) of the information processing device of changes when changes occur in some states of the device. The IRQ number is an identification number for, when notifying the CPU of a change in the state of the device, identifying which device is carrying out the notification.

When an information processing device accesses a device, the input and output of data to the device is carried out by designating as an operand the storage location of data necessary when accessing the device such as the I/O port number for operation codes such as "inb" and "outb."

By assigning I/O port numbers or IRQ numbers to devices that are connected in this way, the information processing device is able to recognize these devices, and by designating the I/O port number or IRQ number that is assigned to a device, is able to access the devices.

In a normal information processing device, the above-described process of initializing devices is carried out by firmware such as the BIOS (Basic Input/Output System) and the OS (Operating System).

A device initialization process for enabling access from the firmware to devices that are connected to the information processing device (first initialization process) is executed in the firmware. The device initialization process of devices for realizing basic functions of the information processing device such as, in the case of a personal computer, a disk device, keyboard, mouse, or video card is carried out in the firmware.

Firmware is a program that is executed first upon introduction of the power supply to the information processing device and has the role of, for example, carrying out a check for breakdowns of the hardware of the information processing device and the above-described device initialization process, then loading the OS to memory from a non-volatile storage medium such as a hard disk, and executing the OS.

In the OS, on the other hand, a device initialization process (a second initialization process) is carried out to enable access to devices that are connected to the information processing device from the OS or a user application that operates on the OS. For example, in the case of a personal computer, initialization processes are carried out in the OS for devices that use the OS, such as devices that correspond to each of the device drivers belonging to the OS.

Thus, device initialization processes must be carried out a total of two times in the firmware and the OS at the time of start-up of an information processing device, and the activation of an information processing device therefore takes a long time when devices having time-consuming initialization processes are connected to the information processing device.

The time required for initialization processes depends on the types of devices, but a SCSI device that is connected using a SCSI (Small Computer System Interface) is one specific example of a device that involves a time-consuming initialization process. SCSI is an interface (standard) for carrying out the exchange of data between the information processing device and devices.

An information processing device uses, instead of the above-described I/O port numbers, identification numbers referred to as "SCSI-IDs" that have been set to SCSI devices in advance to identify the SCSI devices that are connected. The SCSI-IDs can be set by manipulating jumper switches that are installed in each SCSI device.

In the initialization process of SCSI devices that are connected, the information processing device designates each SCSI-ID in order and transmits a special signal to the SCSI bus.

When there is a SCSI device having the designated SCSI-ID, this SCSI device executes a response to the information processing device, and from this response from the SCSI device, the information processing device is able to detect and recognize that a SCSI device having the SCSI-ID is connected.

On the other hand, when a SCSI device having the designated SCSI-ID is not present, the information processing device waits for a response from a SCSI device until the passage of a set time interval that has been set in advance, and when there is no response, determines that a SCSI device having this SCSI-ID is not connected.

In this way, an information processing device successively carries out the above-described processes for recognizing SCSI devices for all SCSI-IDs in the SCSI device initialization process and generates a wait time of a set time interval with each designation of a SCSI-ID for which there is no device, and the SCSI device initialization process therefore becomes extremely time-consuming (refer to Sugaya Seiichi, "Detailed Commentary of SCSI-2" CQ Publishing, Aug. 15, 1994, pp. 47-53).

As described hereinabove, to achieve a state in which a device can be accessed from an information processing device, a device initialization process must be carried out at the time of activation of the information processing device. However, when the configuration of devices that are connected to the information processing device has not undergone any changes from the previous activation, a portion of the device initialization processes is unnecessary in some cases.

For example, a device that is connected to the information processing device continues to use the I/O port number and IRQ number that were assigned from the information processing device until the device has been disconnected from the information processing device or until a new device is connected to the information processing device and a change occurs in the configuration of devices that are connected to the information processing device.

In addition, when register information that is set in a register specific to the device is not information that is determined each time upon activation of the information processing device, such as a SCSI-ID that is set in advance in a device, i.e., is information that, once values have been determined, does not change until the device is disconnected from the information processing device, the device continues to use the same register information specific to the device.

Accordingly, when there is no change to the configuration of the connected devices, there will be no change to device control information necessary for access of devices by the information processing device such as I/O port numbers, IRQ numbers, and register information specific to devices, and as a result, the reuse of previously set device control information when again carrying out the device initialization process eliminates the need to carry out the process of setting device control information (device recognition process).

There are methods for omitting device recognition processes from the device initialization process by using the above-described feature to, when there has been no change to the configuration of devices connected to the information processing device, store device control information that has once been set in devices in a non-volatile storage medium, and then use the device control information that is stored in the non-volatile storage medium when again carrying out the device initialization process.

As an example that uses this method, JP-A-2006-259903 discloses a technique that omits device recognition processes by first storing in flash BIOS-ROM device information that includes device control information that has once been set in devices in a device initialization process in BIOS and then using the device information that has been stored in flash BIOS-ROM when again carrying out the device initialization process.

The configuration and operations of the system that uses the technique for omitting the device recognition process disclosed in JP-A-2006-259903 are next explained using the block diagram of FIG. 1 and the flow charts of FIGS. 2 and 3.

Explanation first regards the configuration of this system. As shown in FIG. 1, the system disclosed in JP-A-2006-259903 includes flash BIOS memory 1000, stores device information of each device such as memory information 1001 or drive information 1002 in flash BIOS memory 1000 in the device initialization process in BIOS at the time of activating the information processing device, and then uses the device information that has been stored when BIOS again carries out the device initialization process.

Explanation next regards the operations of the system that uses the technique disclosed in JP-A-2006-259903.

Referring to the flow chart of FIG. 2, the power supply is first applied to the information processing device (power supply ON) in S36.

A factor for wake-up is next acquired from EC/KBC in S37. EC/KBC measures the time interval that the power supply has been applied and, based on the length of this time interval, distinguishes whether the factor for wake-up is a simplified POST process or a normal POST process. The POST process refers to a collection of processes that are carried out automatically after the power supply has been applied. This POST process includes the device initialization process realized by the BIOS.

It is next determined whether the acquired factor for wake-up is a simplified POST process or a normal POST process in S38.

If the acquired factor for wake-up is a simplified POST process (YES in S38), the flag of the simplified POST process is set in flash BIOS-ROM 1000 in S39.

On the other hand, if the acquired factor for wake-up is a normal POST process (NO in S38), the memory device initialization process is started without setting the flag in S40.

It is next confirmed whether a flag has been set in flash BIOS-ROM 1000 in S41.

If a flag has not been set in flash BIOS-ROM 1000 (NO in S41), the memory initialization process is carried out in accordance with memory information 1001 that is the device information of the memory device stored in flash BIOS-ROM 1000 in S42.

On the other hand, if a flag has been set (YES in S41), memory information 1001 is acquired (read) from the memory device and the memory device initialization process carried out in accordance with the acquired memory information in S43, and the memory information 1001 that was acquired from the memory device is stored in flash BIOS-ROM 1000 in S44.

The initialization process of a memory device is completed by the above-described processes in S45.

The process next transitions to the flow chart of FIG. 3 and the drive device initialization process is started in S46.

It is next checked whether a flag has been set in flash BIOS-ROM 1000 in S47, and if a flag has been set (YES in S47), the drive device initialization process is carried out in accordance with drive information 1002 that is stored in flash BIOS-ROM 1000 and that is the device information of the drive device in S48.

On the other hand, if a flag has not been set (NO in S47), drive information 1002 is acquired (read) from the drive device and the drive device initialization process is carried out in accordance with acquired drive information 1002 in S49, and drive information 1002 that was acquired from the drive device is stored in flash BIOS-ROM 1000 in S50.

The BIOS then completes the drive device initialization process in S51 and activates the OS in S52.

In the technique disclosed in JP-A-2006-259903, the device recognition process is omitted from the device initialization process in the BIOS by means of these operations.

In addition, JP-A-2005-284491 discloses a technique for omitting various processes including device recognition processes from the OS initialization process by first storing a memory image at the time of completion of the OS initialization process in a nonvolatile storage medium in the OS initialization process and then, when again carrying out the OS initialization process, developing in memory the memory image that was stored.

In this way, an increase in the speed of activation of an information processing device can be achieved when device recognition processes for setting device control information are omitted from the device initialization process in the firmware or OS.

However, the techniques disclosed in JP-A-2006-259903 and JP-A-2005-284491 have problems, as next described.

The techniques disclosed in JP-A-2006-259903 and JP-A-2005-284491 use the feature in which device information that has once been acquired can be reused as long as there is no change to the configuration of devices connected to the information processing device and thereby shorten the time interval required for the device initialization process in the firmware or OS and achieve a faster activation of the information processing device.

These techniques therefore have the drawback in which a higher speed of activation of the information processing device cannot be achieved when a change has occurred in the configuration of devices that are connected to the information processing device.

SUMMARY OF THE INVENTION

It is an object of the present invention to provide an information processing device and a device initialization method in an information processing device that can solve the above-described problem.

The information processing device of the present invention for achieving the above-described object is an information processing device that includes: an initialization unit that is realized by the execution of firmware for carrying out a first initialization process for enabling access from the firmware to devices that are connected to the information processing device; a control unit that is realized by execution of an operating system for, after execution of the firmware, carrying out a second initialization process for enabling access of the devices from the operating system; and a main memory unit; the initialization unit including a device initialization unit for, in the first initialization process, setting device control information that is necessary for accessing a device that is the object of the first initialization process and an initialization information storage unit for storing in the main memory unit initialization information that includes the device control information that has been set by the device initialization unit; and the control unit including a device information application unit for, in the second initialization process, acquiring from the main memory unit initialization information of a device that is the object of the second initialization process.

The device initialization process abbreviation method of the present invention for achieving the above-described object is a device initialization method carried out by an information processing device that includes: an initialization unit that is realized by the execution of firmware for carrying out a first initialization process for enabling access from the firmware to devices that are connected to the information processing device; a control unit that is realized by execution of an operating system for, after execution of the firmware, carrying out a second initialization process for enabling access of the devices from the operating system; and a main memory unit; the initialization unit including a first device initialization step in the first initialization process for setting device control information that is necessary for accessing a device that is the object of the first initialization process, and a storage step of storing in the main memory unit initialization information that includes the device control information that was set in the first device initialization step; and the control unit including a second device initialization step in the second initialization process for acquiring from the main memory unit initialization information of a device that is the object of the second initialization process.

According to the present invention, the information processing device is of a configuration in which an initialization unit that is realized by execution of firmware, in a first initialization process, sets device control information of devices that are the objects of the first initialization process and stores in the main memory unit initialization information that includes the device control information that has been set, and a control unit that is realized by execution of an operating system that, in the second initialization process, acquires from the main memory unit initialization information of devices that are the objects of the second initialization process.

Accordingly, even in the event of a change in the configuration of devices that are connected to an information processing device, the initialization unit can, in the first initialization process, acquire and store in the main memory unit initialization information that reflects the content of changes of the configuration of devices, whereby the control unit can, in the second initialization process, use the initialization information that was acquired from the main memory unit to carry out the device initialization process to omit the process of setting device control information from the second initialization process.

In this way, the present invention has the effect of enabling realization of faster activation of an information processing device even when there has been a change in the configuration of devices connected to the information processing device.

The above and other objects, features, and advantages of the present invention will become apparent from the following description with reference to the accompanying drawings which illustrate examples of the present invention.

BRIEF DESCRIPTION OF THE DRAWINGS

FIG. 11 shows a specific example of the device non-initialization determination list shown in FIG. 10;

FIG. 15 shows a specific example of the biosmap information shown in FIG. 14.

DETAILED DESCRIPTION OF THE PREFERRED EMBODIMENTS

Preferred embodiments for working the present invention are next explained with reference to the accompanying figures.

First Exemplary Embodiment

Figure 1:
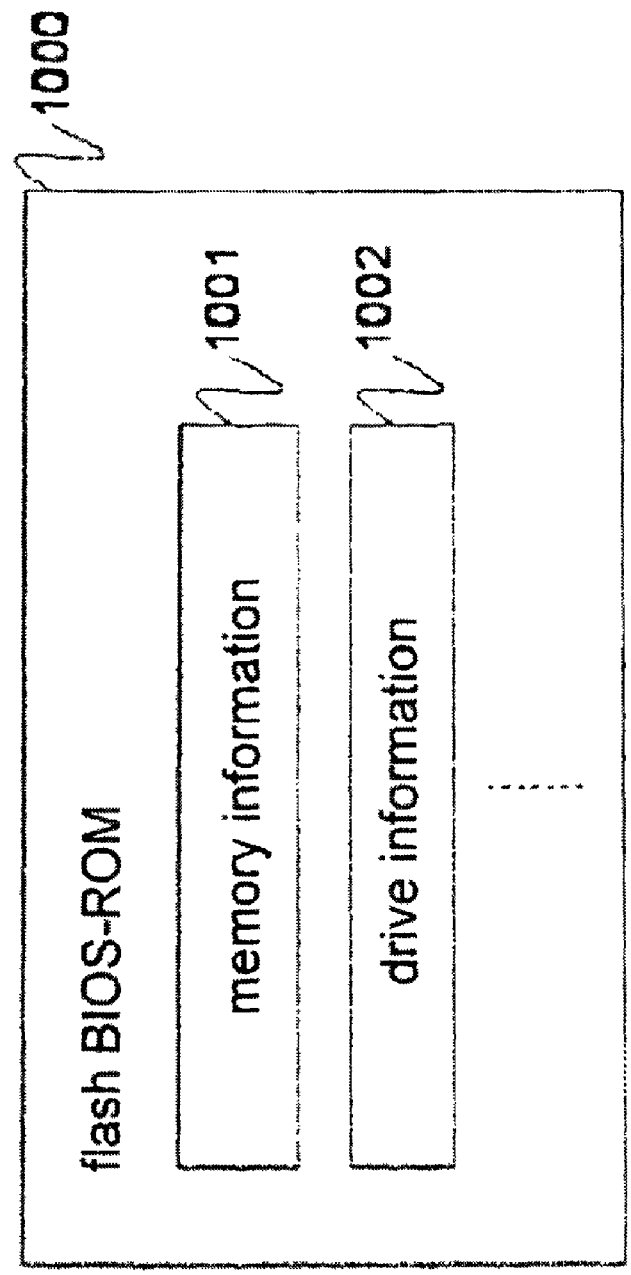
FIG. 1 is a block diagram for explaining the configuration of the system described in JP-A-2006-259903.
Figure 2:
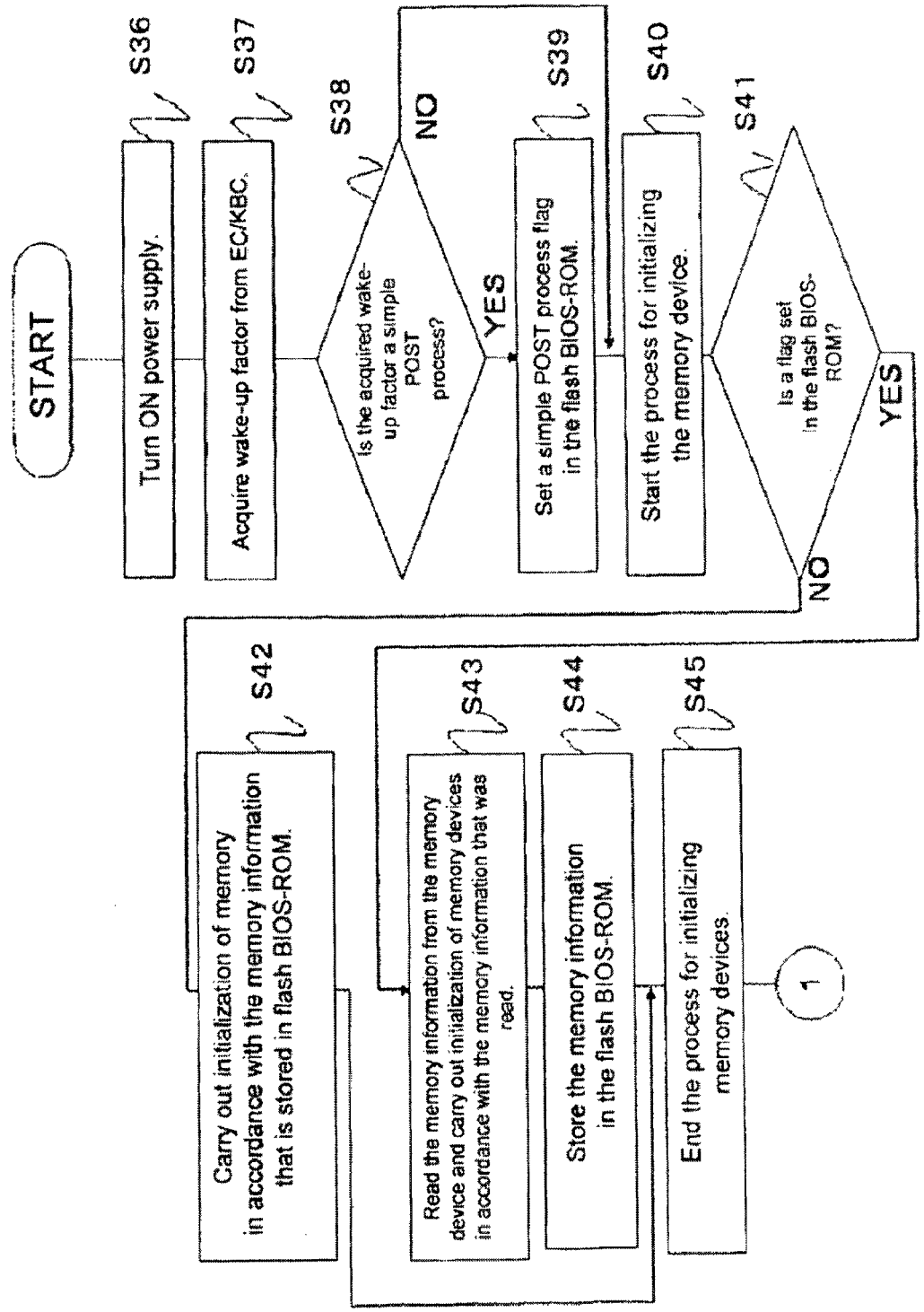
FIG. 2 is a flow chart for explaining the operation of the memory device initialization process in the system shown in FIG. 1.
Figure 3:
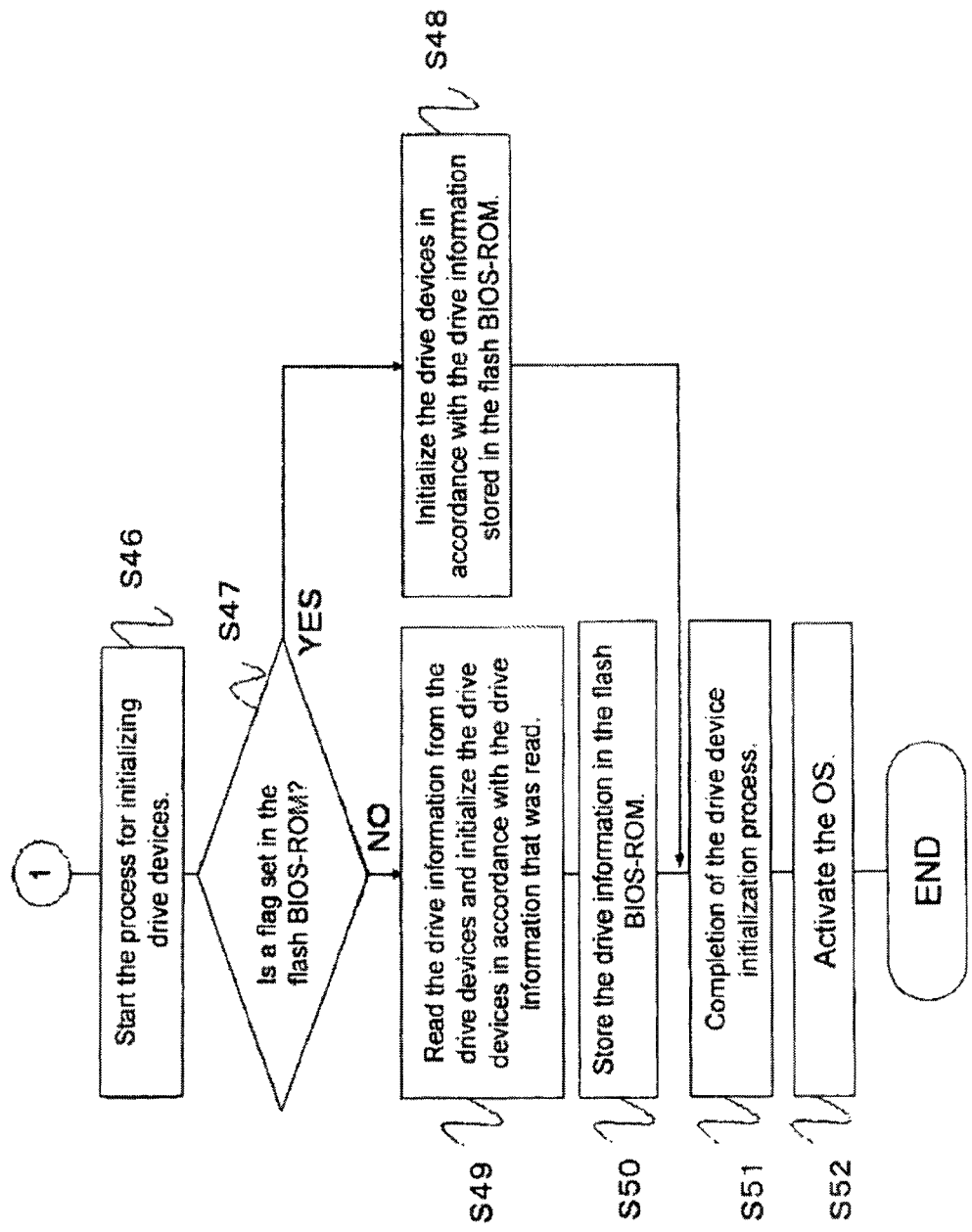
FIG. 3 is a flow chart for explaining the operation of the drive device initialization process in the system shown in FIG. 1.
Figure 4:
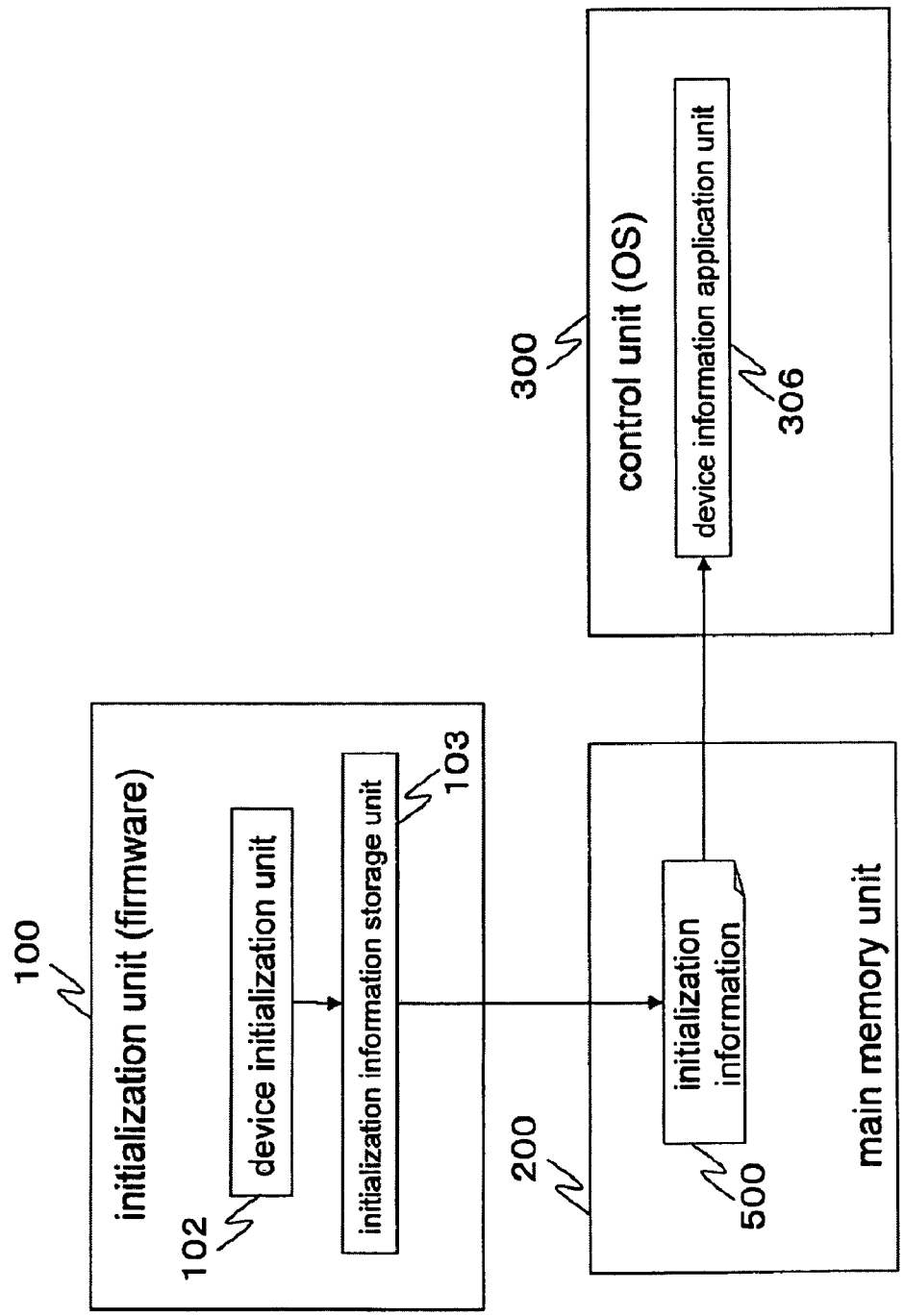
FIG. 4 is a block diagram showing the configuration of the information processing device of the first exemplary embodiment of the present invention.

FIG. 4 shows the configuration of the information processing device of the first exemplary embodiment of the present invention.

As shown in FIG. 4, the information processing device of the present exemplary embodiment includes: initialization unit 100, main memory unit 200, and control unit 300. Initialization unit 100 further includes device initialization unit 102 and initialization information storage unit 103, and control unit 300 further includes a device information application unit.

Initialization unit 100 is realized by the introduction of the power supply to the information processing device and execution by firmware. The firmware is executed before execution of the OS, and processes in initialization unit 100 are therefore all carried out before execution of the OS.

Initialization unit 100 first diagnoses breakdown of hardware of the information processing device and then carries out a device initialization process (first initialization process) by means of device initialization unit 102 to enable access from the firmware to devices that are connected to the information processing device. Device initialization processes are carried out in initialization unit 100 for realizing the basic functions of the information processing device such as, in the case of a personal computer, a disk device, keyboard, mouse, and video card.

In the device initialization process in initialization unit 100, device initialization unit 102 carries out a device recognition process for setting device control information such as I/O port numbers, IRQ numbers, and register information that is specific to devices that are necessary for accessing devices that are the objects of the initialization process.

Initialization information storage unit 103 stores initialization information 500 that includes the device control information that was set by device initialization unit 102 in main memory unit 200.

Main memory unit 200 is the main memory unit belonging to the information processing device, and in the present exemplary embodiment, initialization information storage unit 103 uses main memory unit 200 as the means for storing initialization information 500.

Control unit 300 is realized by the execution of the OS after the device initialization process is performed by initialization unit 100. Control unit 300 carries out a device initialization process (second initialization process) by means of device information application unit 306 to enable access to devices that are connected to the information processing device from the OS. Process for initializing devices used by the OS is carried out in control unit 300.

Device information application unit 306 acquires initialization information 500 from main memory unit 200 in the device initialization process in control unit 300, whereby device information application unit 306, by using acquired initialization information 500, is able to omit processes for setting device control information, i.e., the device recognition process, from the device initialization process.

Figure 5:
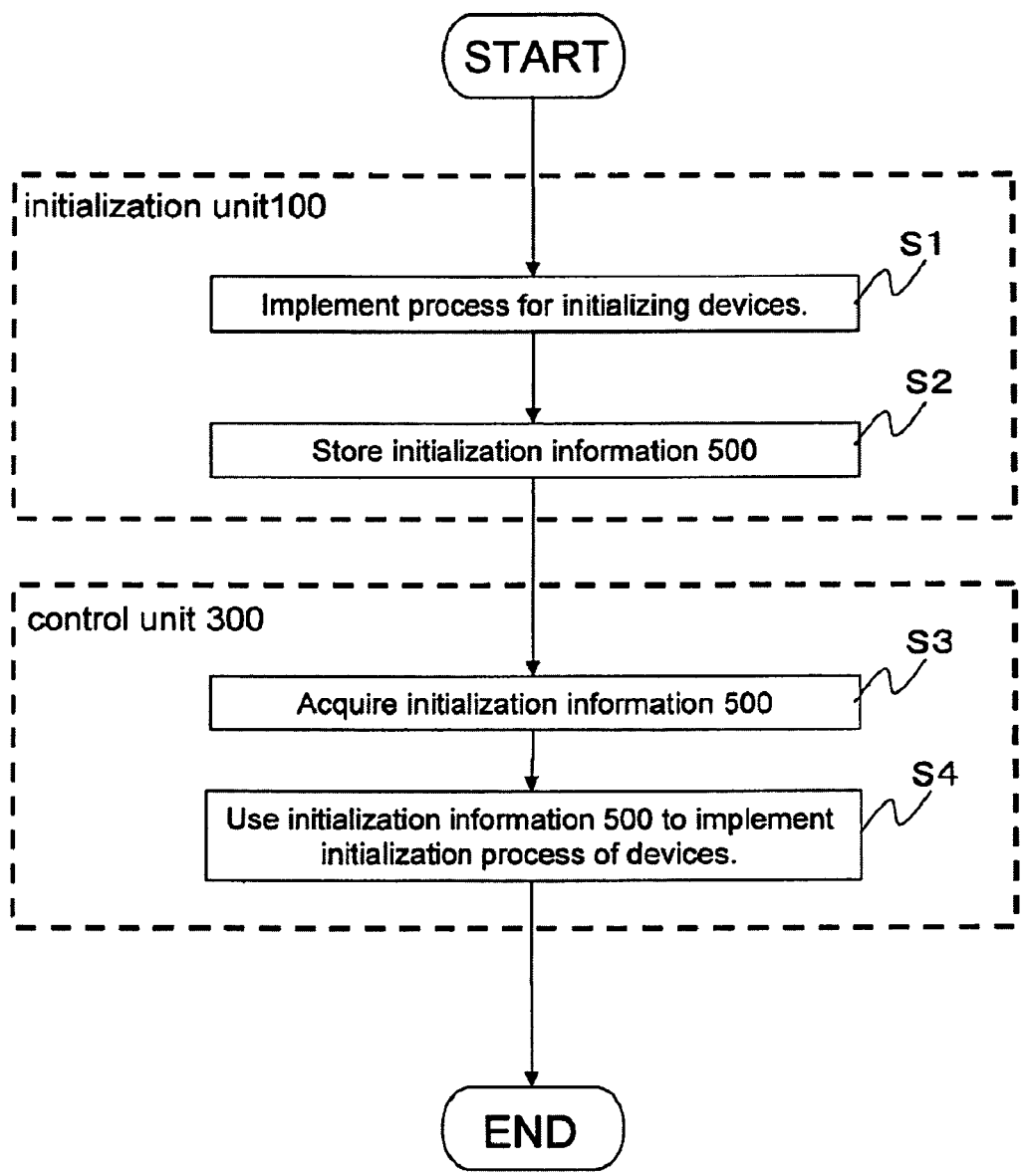
FIG. 5 is a flow chart for explaining the operations of the information processing device shown in FIG. 4.

Explanation next regards the operations of the present exemplary embodiment with reference to the flow chart of FIG. 5.

Device initialization unit 102 first carries out the device initialization process in S1. In the device initialization process, device initialization unit 102 carries out a process for recognizing devices that are the objects of the initialization process in initialization unit 100 and sets the device control information.

Initialization information storage unit 103 next stores in main memory unit 200 initialization information 500 that includes the device control information that device initialization unit 102 wishes to set in S2.

Device information application unit 306 next acquires initialization information 500 that is stored in main memory unit 200 in the device initialization process in control unit 300 in S3.

Device information application unit 306 then uses the initialization information 500 that was acquired to carry out the process for initializing devices that are the objects of the initialization process in control unit 300 in S4.

In this way, device information application unit 306 is able to omit the device recognition process from the device initialization process in control unit 300.

Explanation next regards the effect of the present exemplary embodiment.

As described hereinabove, the information processing device of the present exemplary embodiment is of a configuration whereby, in the first initialization process, initialization unit 100 that is realized by execution of firmware sets the device control information of devices that are the objects of the first initialization process and stores initialization information 500 that contains the device control information that has been set in main memory unit 200, and in the second initialization process, control unit 300 that is realized by execution of the operating system acquires from main memory unit 200 initialization information 500 of devices that are the objects of the second initialization process.

Accordingly, even where a change has occurred in the configuration of devices that are connected to the information processing device, initialization unit 100 is able to acquire initialization information 500 that reflects the content of changes of the configuration of devices and store initialization information 500 in main memory unit 200 in the first initialization process, whereby control unit 300 is able to carry out the initialization process of devices using initialization information 500 that has been acquired from main memory unit 200 in the second initialization process and thus omit the process of setting device control information from the second initialization process.

In this way, the present exemplary embodiment obtains the effect of enabling the realization of faster activation of an information processing device even when there have been changes in the configuration of devices that are connected to the information processing device.

Second Exemplary Embodiment

Figure 6:
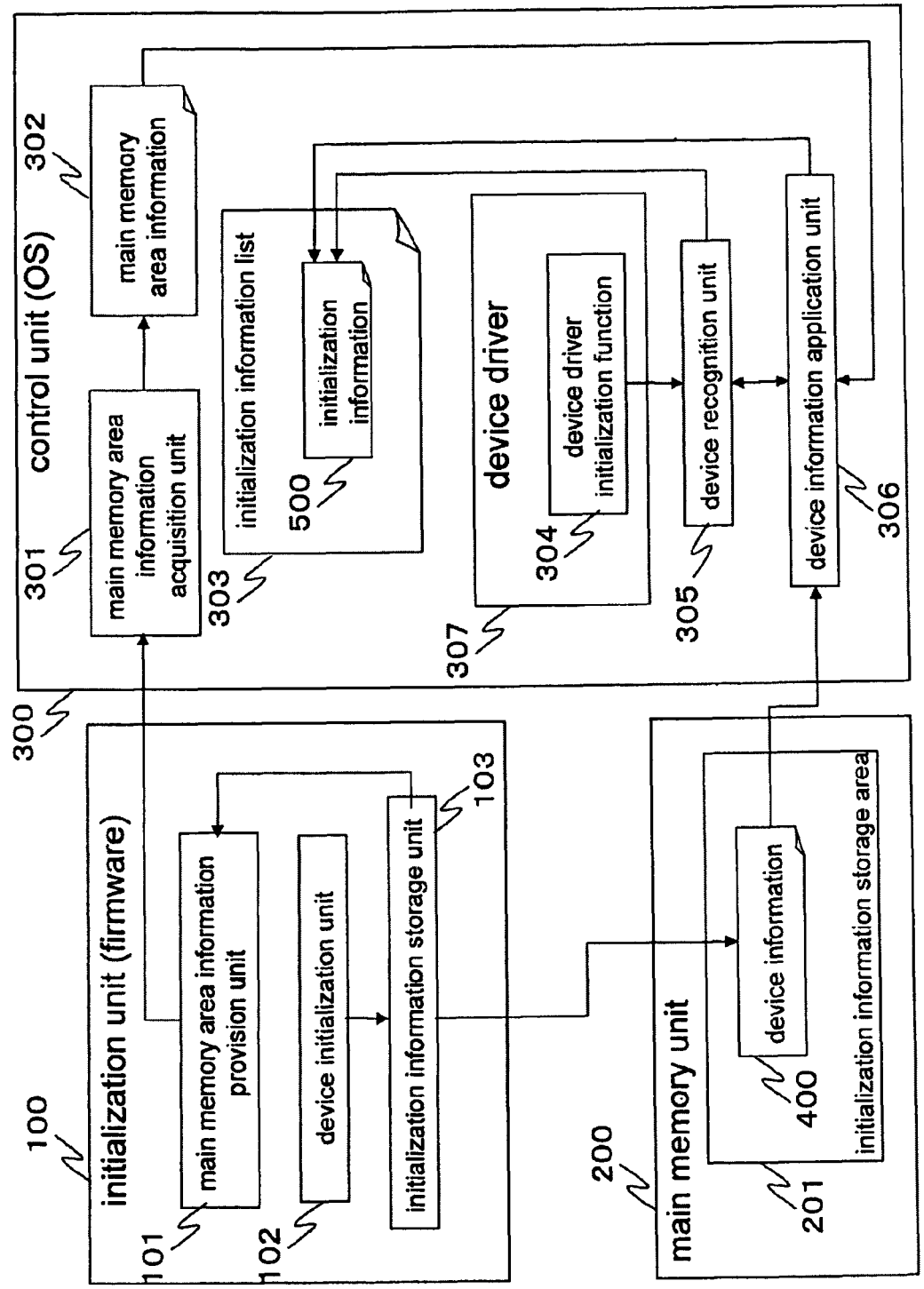
FIG. 6 is a block diagram showing the configuration of the information processing device of the second exemplary embodiment of the present invention.

FIG. 6 shows the configuration of the information processing device of the second exemplary embodiment of the present invention.

As shown in FIG. 6, the information processing device of the present exemplary embodiment differs from the first exemplary embodiment shown in FIG. 4 in that initialization unit 100 includes main memory area information provision unit 101, main memory unit 200 includes initialization information storage area 201, and control unit 300 includes main memory area information acquisition unit 301, main memory area information 302, initialization information 303, device driver 307, and device recognition unit 305. In addition, device driver 307 is assumed to include device driver initialization function 304. Because the constituent elements are otherwise equivalent to those of the first exemplary embodiment, the same reference numbers are given as in FIG. 4 and explanation is abbreviated as appropriate.

In addition to the processes carried out in the first exemplary embodiment, device initialization unit 102 of the present exemplary embodiment further carries out a process of acquiring the device names of devices that are the objects of the initialization process in initialization unit 100.

Initialization information storage unit 103 of the present exemplary embodiment appends the device names that were acquired by device initialization unit 102 to initialization information 500 that was used in the first exemplary embodiment and stores device information 400, that includes information such as the type of device and the I/O memory address in addition to initialization information 500, in initialization information storage area 201 of main memory unit 200. Initialization information storage unit 103 further stores the position information of initialization information storage area 201 that has stored device information 400 in main memory unit 200 as main memory area information 302, which is the position information of each area in main memory unit 200 that is managed by main memory area information provision unit 101.

Main memory area information provision unit 101 is used as a means for managing main memory area information 302 and providing information to control unit 300. In addition, before main memory area information provision unit 101 is accessed by main memory area information acquisition unit 301 of control unit 300, the position information of initialization information storage area 201 is stored as main memory area information 302 by initialization information storage unit 103.

Main memory unit 200 of the present exemplary embodiment includes initialization information storage area 201 for storing device information 400.

Figure 7:
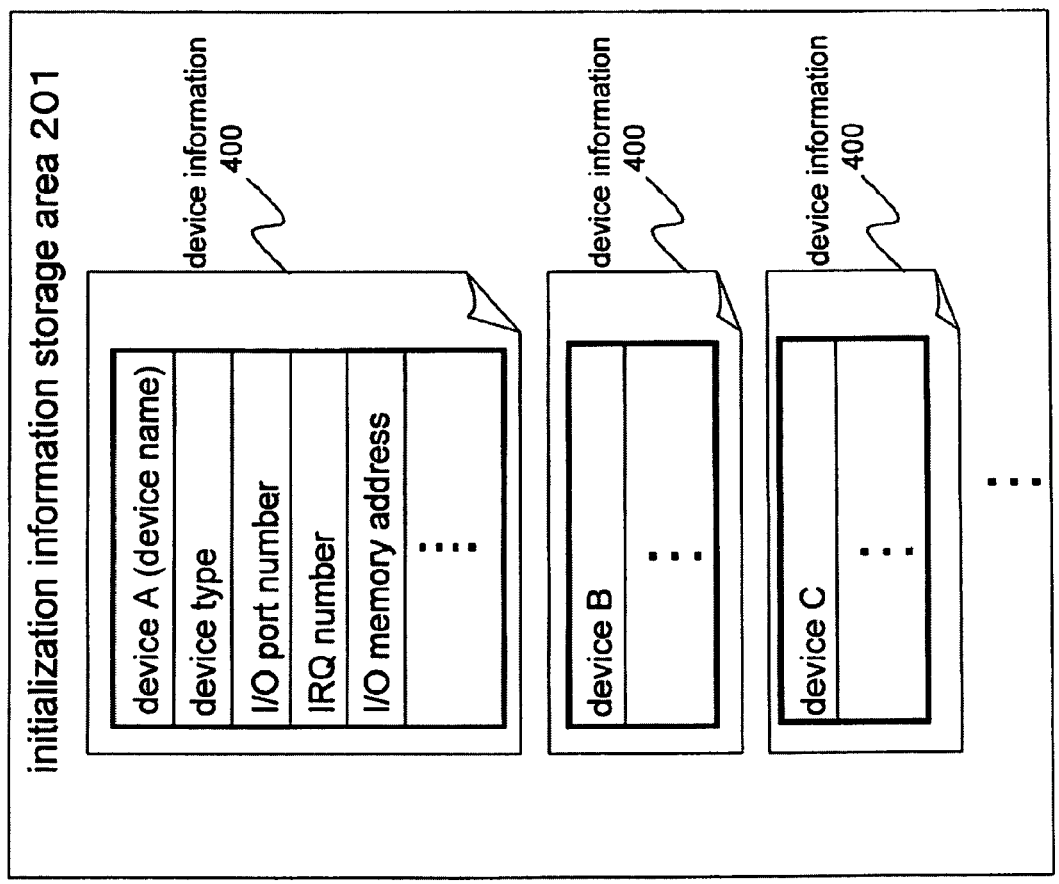
FIG. 7 shows a specific example of the configuration of the initialization information storage area shown in FIG. 6.

Initialization information storage area 201 is an area for the storage of device information 400 by initialization information storage unit 103. FIG. 7 shows the construction of initialization information storage area 201. As shown in FIG. 7, device information 400 of each device is stored in initialization information storage area 201. Further, as shown in FIG. 7, device information 400 that is stored in initialization information storage area 201 is assumed to include device names, device types, I/O port numbers, IRQ numbers, I/O memory addresses, and other setting information specific to devices.

Main memory area information acquisition unit 301 is used as a means for acquiring main memory area information 302 that is provided by main memory area information provision unit 101. The position information of initialization information storage area 201 that stores device information 400 is contained in main memory area information 302 that is acquired by main memory area information acquisition unit 301 and is used by device information application unit 306.

Initialization information list 303 is a list in which initialization information 500 is registered. Initialization information 500 that is registered in initialization information list 303 contains device names, I/O port numbers, IRQ numbers, and other setting information specific to devices.

In addition, by using initialization information 500 of each device that is registered in initialization information list 303, the OS is able to recognize and to access devices.

Device drivers 307 provide the OS or user applications that run on the OS with the functions for accessing devices that are connected to the information processing device. For this purpose, device drivers 307 use device driver initialization function 304 to carry out the initialization process of devices. Device drivers 307 then, based on initialization information 500 that has been obtained by the device initialization process, associate the operational functions of devices that are the parts that perform actual operations to the interfaces of abstract functions such as "read" and "write" that are provided by control unit 300. In this way, the OS or a user application is able to access devices by using functions such as "read" or "write" that are prepared by control unit 300. Because the information that is set or the operation method differs by device, device drivers 307 are prepared as information specific to each device.

Consequently, because the OS accesses devices through device drivers 307, in the device initialization process (second initialization process) in the OS, processes for initializing specific devices are carried out that correspond to devices used by the OS, i.e., that correspond to each device driver 307 held by the OS.

Device driver initialization function 304 is accessed by device driver 307, and the initialization process is carried out for, from among the devices that are connected to the information processing device, the specific device that corresponds to device driver 307. Similar to device drivers 307, device driver initialization functions 304 are prepared specific to each device.

Device recognition unit 305 is accessed by device driver initialization functions 304 and carries out an initialization processes for, from among the devices that are connected to the information processing device, initializing specific devices that correspond to device drivers 307 and device driver initialization functions 304.

More specifically, device recognition unit 305 first confirms the connection state of a specific device and acquires basic information such as the device name of the specific device. Device recognition unit 305 next, before carrying out the device recognition process of the specific device, causes device information application unit 306 to determine whether the device name of the specific device in device information application unit 306 matches a device name contained in device information 400 that was acquired from initialization information storage area 201. If the device name matches, device recognition unit 305 performs a device recognition process for recognizing the specific device to set the device control information and registers initialization information 500 that includes the device name and device control information of the specific device in initialization information list 303.

Upon being notified of the device name of a specific device from device recognition unit 305, device information application unit 306 of the present exemplary embodiment extracts the position information of initialization information storage area 201 from main memory area information 302 and uses the position information of initialization information storage area 201 that has been extracted to specify the position of initialization information storage area 201 in main memory unit 200. Device information application unit 306 then acquires device information 400 from initialization information storage area 201 for which the position was specified.

Device information application unit 306 further determines whether the device name of the specific device matches a device name contained in device information 400 acquired from initialization information storage area 201, and if the device name matches, extracts initialization information 500 from device information 400 that was acquired from initialization information storage area 201 and registers the initialization information 500 that was extracted as the initialization information of the specific device in initialization information list 303.

Figure 8:
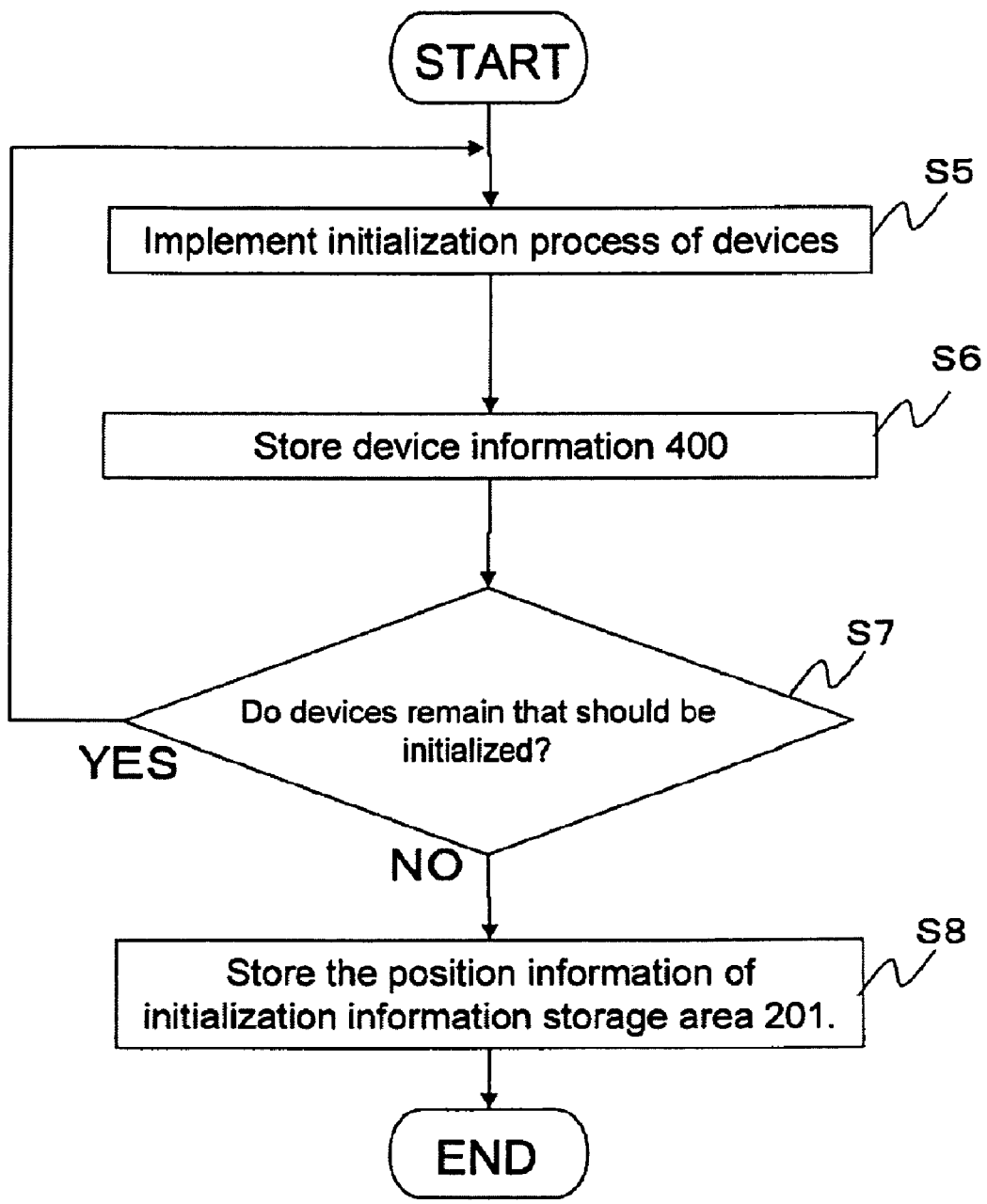
FIG. 8 is a flow chart for explaining the operations of the device initialization process in the initialization unit shown in FIG. 6.
Figure 9:
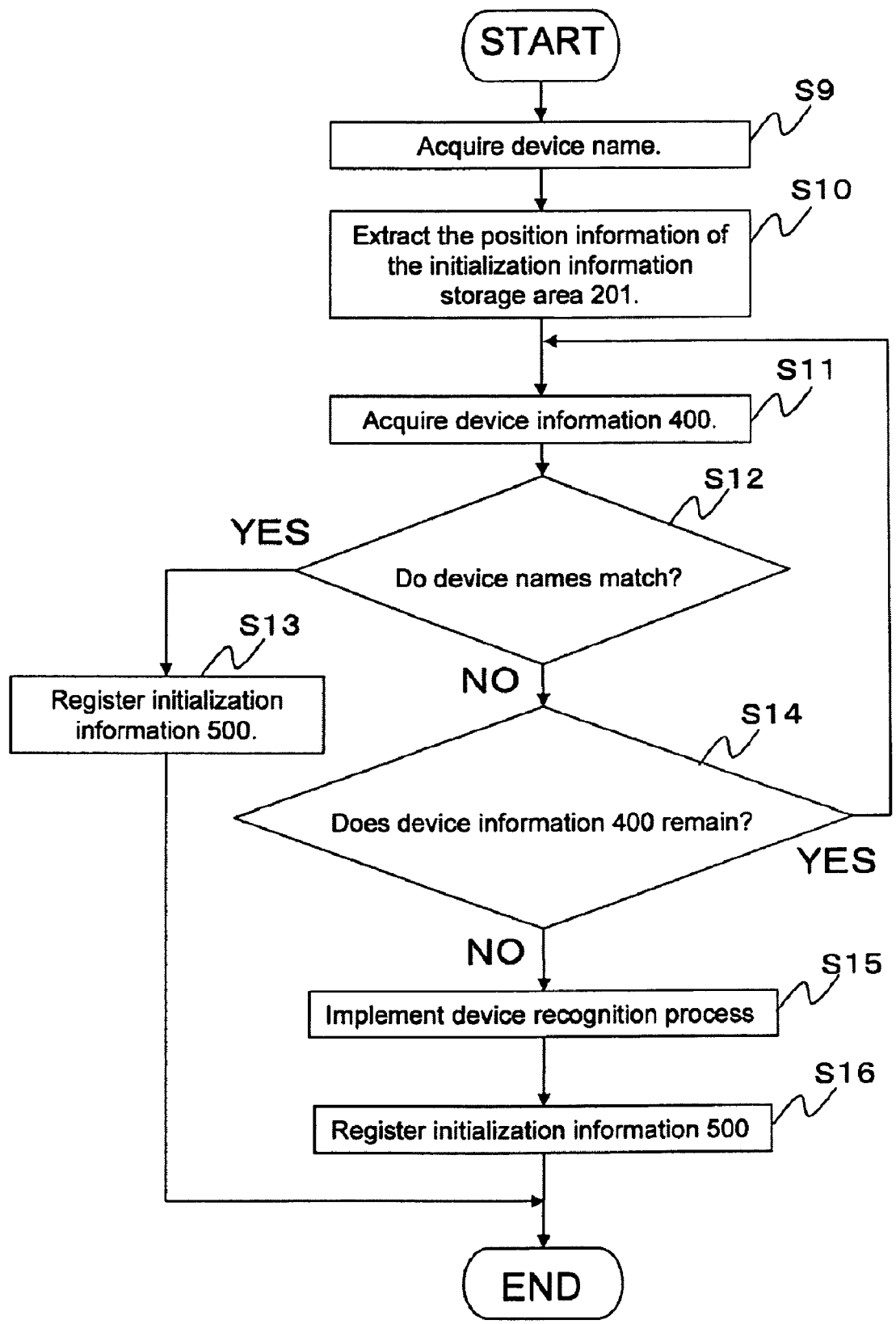
FIG. 9 is a flow chart for explaining the operations of the device initialization process in the control unit shown in FIG. 6.

Explanation next regards the operations of the information processing device of the present exemplary embodiment with reference to the flow charts of FIGS. 8 and 9.

The flow chart of FIG. 8 shows the operations of each unit of initialization unit 100. These operations are carried out in advance before control unit 300 is realized by the execution of OS and device driver initialization function 304 is executed through device driver 307.

Referring to the flow chart of FIG. 8, device initialization unit 102 first carries out the process for initializing devices that are connected to the information processing device in S5. In the device initialization process, device initialization unit 102 in initialization unit 100 both acquires the device names of devices that are the objects of the initialization process and sets device control information by carrying out a device recognition process for recognizing these devices.

Initialization information storage unit 103 next stores, in initialization information storage area 201 in main memory unit 200, device information 400 that includes: initialization information 500 that includes device names acquired by device initialization unit 102 and device control information that has been set, and information such as device types and I/O memory addresses in S6.

Initialization information storage unit 103 next determines whether a device remains that should be initialized in S7.

When a device remains that should be initialized (YES in S7), initialization information storage unit 103 causes device initialization unit 102 to carry out the process for initializing the next device. Initialization information storage unit 103 repeats these processes until the process for initializing all devices that are objects of the initialization process is completed.

When no device remains that should be initialized (NO in S7), initialization information storage unit 103 adds position information of initialization information storage area 201 in main memory unit 200 that has stored device information 400 of each device to main memory area information 302 that is managed by main memory area information provision unit 101 in S8.

The flow chart of FIG. 9 shows the operations of each unit of control unit 300. These operations are started when device driver initialization functions 304 are executed through device drivers 307 by control unit 300 that is realized by firmware that loads the OS in main memory unit 200 and that executes the OS after the initialization process of device in initialization unit 100.

Referring to the flow chart of FIG. 9, device driver initialization function 304 first accesses device recognition unit 305 to carry out the initialization process of a specific corresponding device among the devices that are connected to the information processing device.

When carrying out the process for initializing a specific device, device recognition unit 305 first checks the connection state of the specific device and acquires the device name of the specific device in S9. Device recognition unit 305 then, before carrying out the device recognition process for recognizing the specific device, designates the device name of the specific device that has been acquired to access device information application unit 306.

Device information application unit 306 next extracts the position information of initialization information storage area 201 from main memory area information 302 in S10.

Device information application unit 306 then uses position information of initialization information storage area 201 that was extracted from main memory area information 302 to specify a position of initialization information storage area 201 in main memory unit 200 and acquire device information 400 from initialization information storage area 201 for which a position was specified in S11.

Device information application unit 306 next determines whether the device name of the specific device that was acquired by device recognition unit 305 matches a device name contained in device information 400 acquired from initialization information storage area 201 in S12.

When the device name matches (YES in S12), device information application unit 306 extracts initialization information 500 from device information 400 that was acquired and registers the initialization information 500 in initialization information list 303 in S13.

The registration of initialization information 500 in initialization information list 303 enables access of the specific device from the OS and completes the process for initializing the specific device. In this case, initialization information 500 was extracted from device information 400 that was acquired from initialization information storage area 201, and the device recognition process was therefore omitted from the initialization process.

In contrast, when the device name does not match (NO in S12), device information application unit 306 determines whether other device information 400 remains in initialization information storage area 201 in S14.

If other device information 400 remains in initialization information storage area 201 (YES in S14), device information application unit 306 acquires the other device information 400 from initialization information storage area 201. Device information application unit 306 determines whether device information 400 that contains the device name of the specific device is stored in initialization information storage area 201 by repeating this process.

When other device information 400 does not remain in initialization information storage area 201 (NO in S14), in other words, when there is no device information 400 that contains the device name of the specific device, device information application unit 306 completes the process and accesses device recognition unit 305.

When device information 400 that contains the device name of the specific device is not present in initialization information storage area 201, device recognition unit 305 sets the device control information by carrying out the device recognition process for recognizing the specific device according to the normal device initialization process in S15 and registers initialization information 500 that contains the device name of the specific device and the device control information in initialization information list 303 in S16.

Explanation next regards the effects of the present exemplary embodiment.

As described hereinabove, the information processing device of the present exemplary embodiment is of a configuration whereby initialization unit 100 that is realized by the execution of firmware appends the position information of initialization information storage area 201 for which device information 400 is stored in main memory area information 302, and control unit 300 that is realized by the execution of the OS extracts the position information of initialization information storage area 201 from main memory area information 302 that is acquired from initialization unit 100 to specify the position of initialization information storage area 201 in main memory unit 200 and acquire device information 400 from initialization information storage area 201 for which the position was specified.

Accordingly, in addition to the effects obtained in the first exemplary embodiment, the present exemplary embodiment obtains the effect of enabling the guarantee of initialization information storage area 201 at any position on main memory unit 200.

In addition, as described hereinabove, the information processing device of the present exemplary embodiment is of a configuration in which, when the device name contained in device information 400 acquired from initialization information storage area 201 does not match the device name of the specific device, control unit 300 that is realized by the execution of the OS sets the device control information of the specific device (device recognition process) and registers initialization information 500 that contains the device control information and the device name of the specific device in initialization information list 303.

Accordingly, in addition to the above-described effects, the present exemplary embodiment obtains the effect of enabling access to a device from the OS even when device information 400 could not be acquired for the device in the device initialization process in initialization unit 100.

Third Exemplary Embodiment

Figure 10:
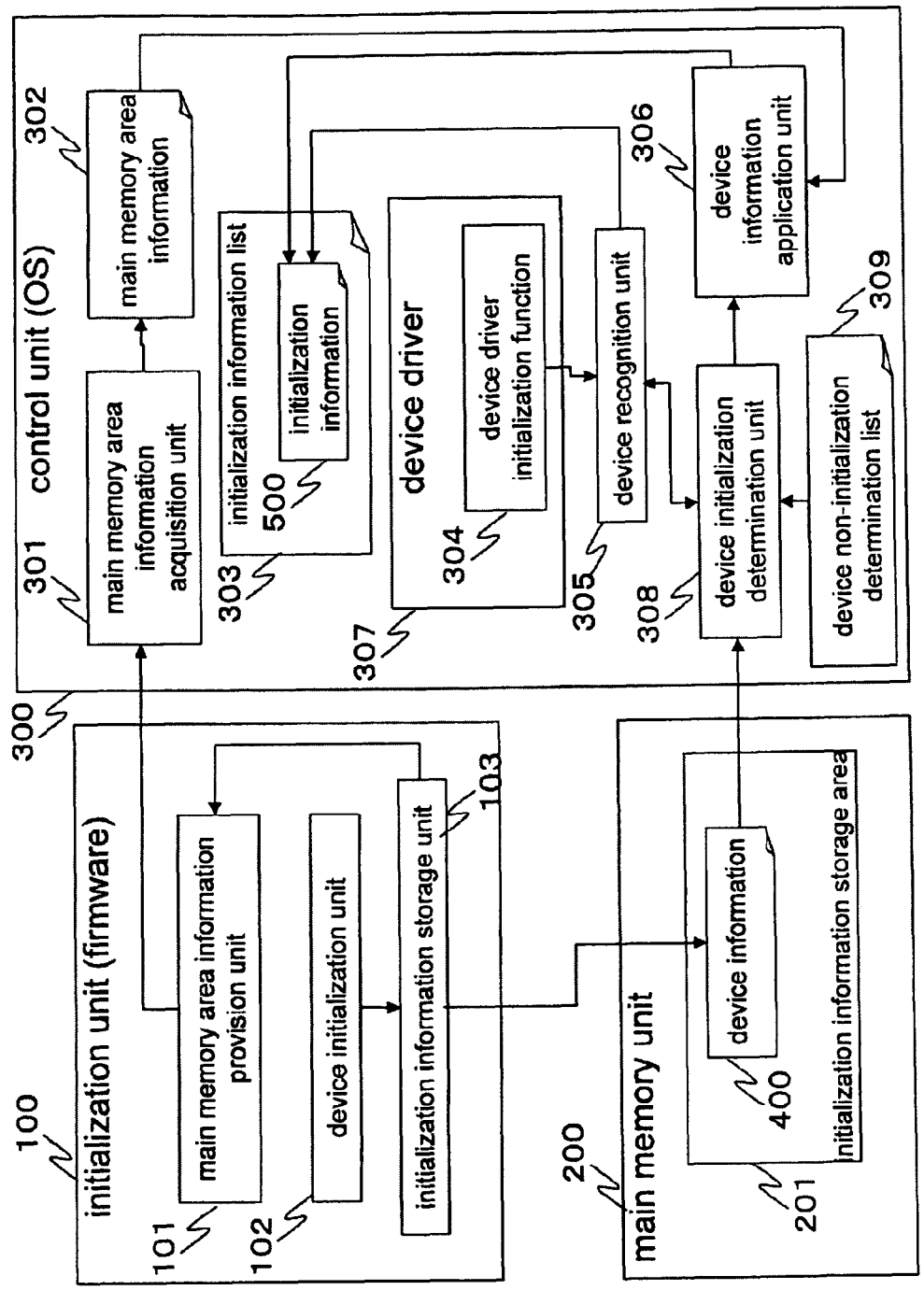
FIG. 10 is a block diagram showing the configuration of the information processing device of the third exemplary embodiment of the present invention.

FIG. 10 shows the configuration of the information processing device of the third exemplary embodiment of the present invention.

As shown in FIG. 10, the present exemplary embodiment differs from the second exemplary embodiment shown in FIG. 6 in that device initialization determination unit 308 and device non-initialization determination list 309 have been added to control unit 300. The constituent elements are otherwise equivalent to those of the third exemplary embodiment and are therefore given the same reference numbers and redundant explanation is omitted.

Device non-initialization determination list 309 is a list in which are recorded the device names of devices for which device information 400 is not acquired from initialization information storage area 201 in the device initialization process in control unit 300. FIG. 11 shows an actual example of device non-initialization determination list 309.

Device initialization determination unit 308 determines whether the device name of a specific device that device recognition unit 305 acquired is recorded in device non-initialization determination list 309.

When the device name of a specific device is recorded, device initialization determination unit 308 determines that the device is a device for which device information 400 is not acquired from initialization information storage area and accesses device recognition unit 305. Device recognition unit 305 sets the device control information by carrying out the device recognition process for recognizing the specific device according to the normal device initialization process and registers the initialization information 500 that contains the device control information and the device name of the specific device in initialization information list 303.

On the other hand, when the device name of the specific device is not recorded, device initialization determination unit 308 accesses device information application unit 306. Device information application unit 306 acquires device information 400 from initialization information storage area 201 and carries out the initialization process of the specific device.

Figure 12:
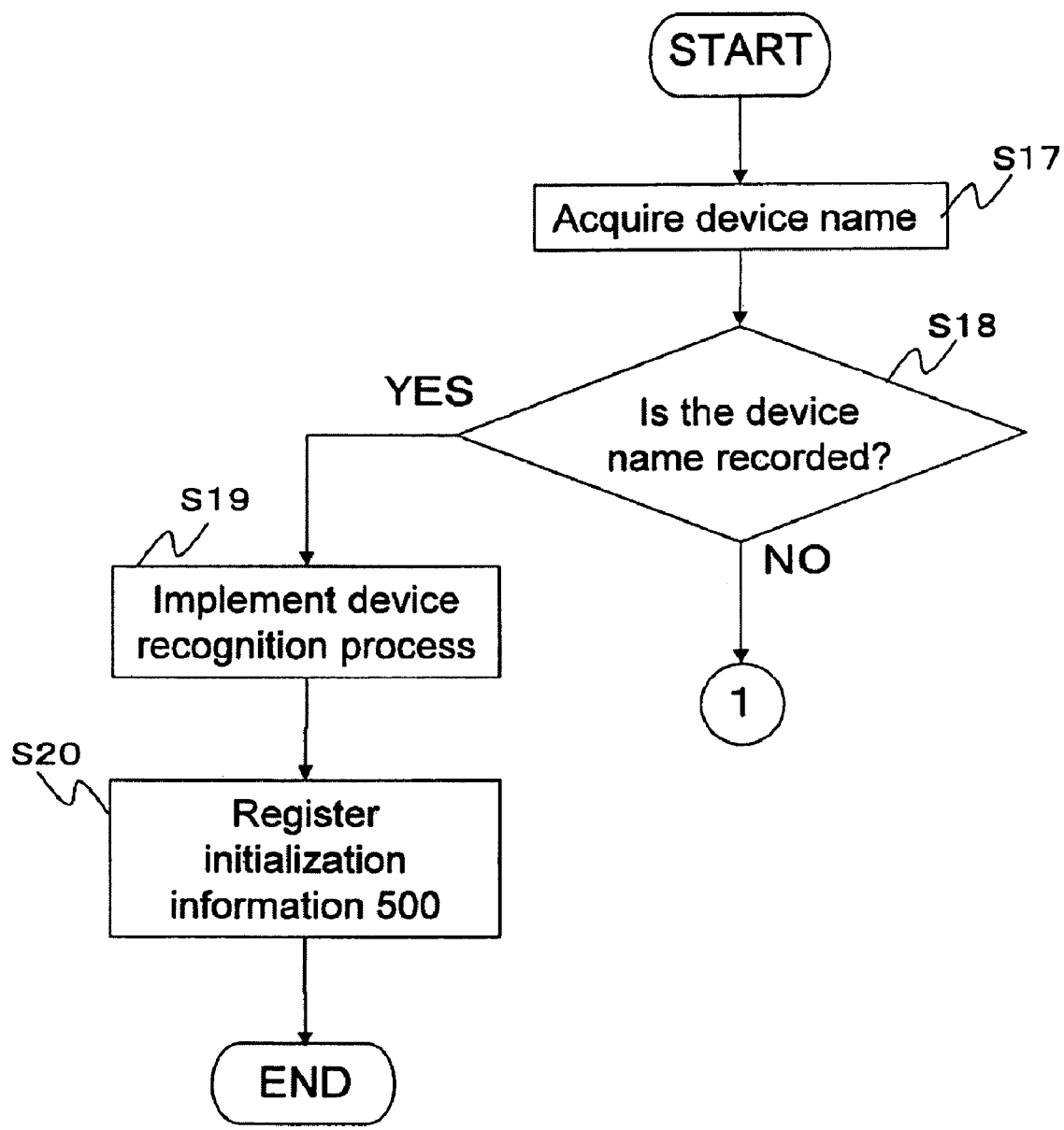
FIG. 12 is a flow chart for explaining the operations of the device initialization process in the control unit shown in FIG. 10.
Figure 13:
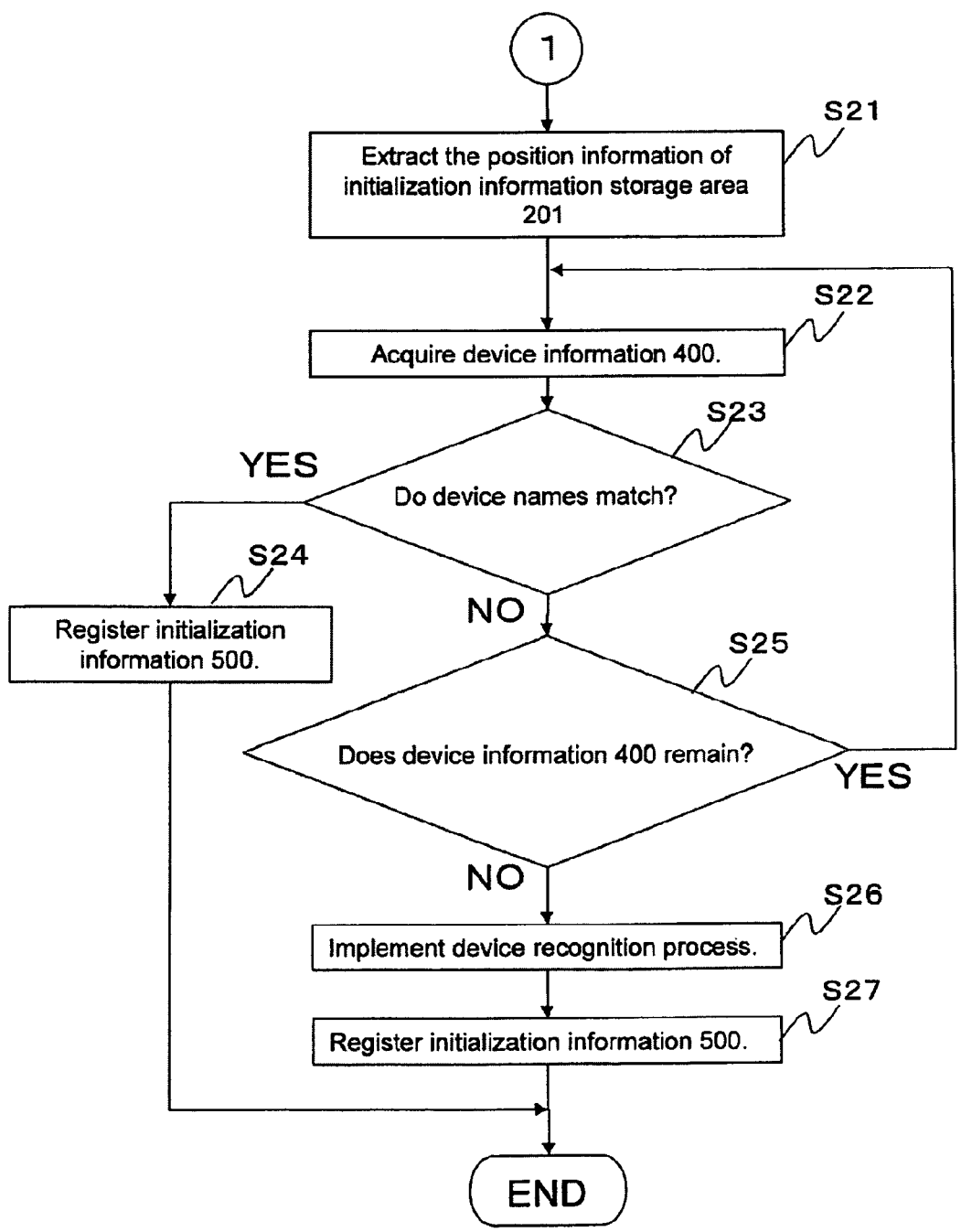
FIG. 13 is a flow chart for explaining the operations of the device initialization omission process in the control unit shown in FIG. 10.

Explanation next regards the operations of the present exemplary embodiment with reference to the flow chart of FIGS. 12 and 13. The operations of each unit in initialization unit 100 are the same as the operations in the second exemplary embodiment described in FIG. 8 and redundant explanation is therefore omitted.

The flow charts of FIGS. 12 and 13 show the operations of each unit of control unit 300. These operations are started when device driver initialization function 304 is executed through device driver 307 by control unit 300 that is realized by firmware that loads the OS in main memory unit 200 and that executes the OS after initialization unit 100 completes the process of initializing device.

Referring to the flow chart of FIG. 12, device driver initialization function 304 first accesses device recognition unit 305 to carry out the process for initializing the corresponding specific device from among the devices that are connected to the information processing device.

When carrying out the process for initializing the specific device, device recognition unit 305 first checks the connection state of the specific device and then acquires the device name of the specific device in S17. Device recognition unit 305 then, before carrying out the device recognition process for recognizing the specific device, designates the device name of the specific device that has been acquired to access device initialization determination unit 308.

Device initialization determination unit 308 then determines whether the device name of the specific device that device recognition unit 305 acquired is recorded in device non-initialization determination list 309 in S18.

If the device name of the specific device is recorded (YES in S18), device initialization determination unit 308 accesses device recognition unit 305. Device recognition unit 305 that has been accessed by device initialization determination unit 308 sets the device control information by carrying out the device recognition process for recognizing the specific device according to the normal device initialization process in S19 and registers initialization information 500 that includes the device control information and device name of the specific device in initialization information list 303 in S20.

When the device name of the specific device is not recorded, the process transitions to FIG. 13. The processes of S21-S27 of FIG. 13 are equivalent to the processes of S10-S16 of FIG. 9 and explanation is therefore here omitted.

Explanation next regards the effects of the present exemplary embodiment.

As described hereinabove, the information processing device of the present exemplary embodiment is of a configuration in which control unit 300 that is realized by the execution of the OS, by determining whether the device name of the device that is the object of the initialization process in control unit 300 is listed in device non-initialization determination list 309, determines whether to acquire device information 400 from initialization information storage area 201 to carry out the process for initializing device.

In this way, in addition to the effects of the first and second exemplary embodiment, the present exemplary embodiment obtains the effect of enabling the selection of, from among the devices that are connected to the information processing device, those devices for which the device initialization process is carried out by acquiring device information 400.

Working Example

A preferable exemplary embodiment for working the present invention is next explained using an actual working example.

Figure 14:
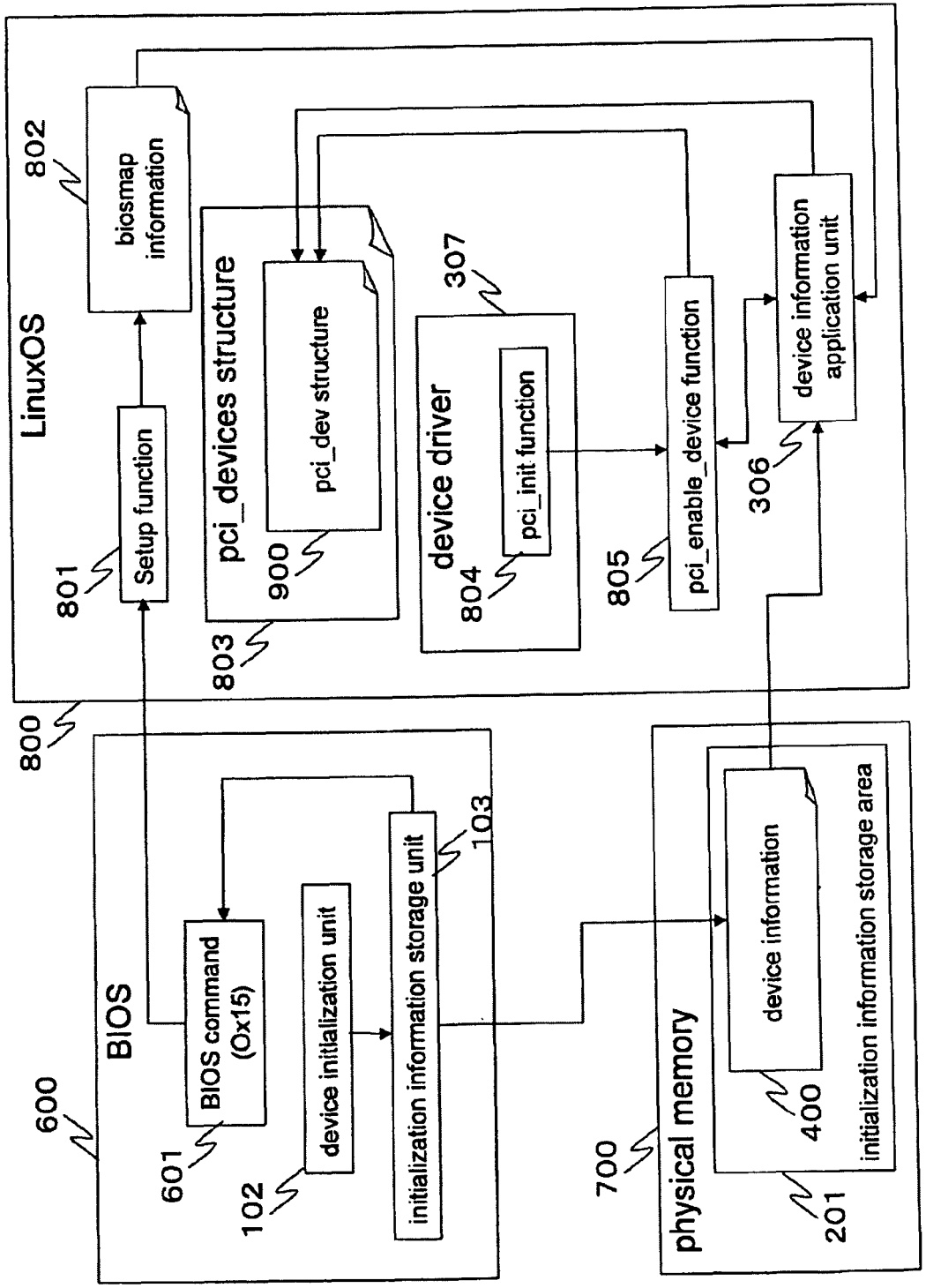
FIG. 14 is a block diagram showing the configuration of the working example that realizes the second exemplary embodiment of the present invention.

FIG. 14 shows the configuration of the information processing device of the present working example.

The present working example is a specific case of the second exemplary embodiment shown in FIG. 6, and explanation regards the operations when the present invention is applied in the initialization process of a PCI device that is connected to an information processing device by using a PCI.

As shown in FIG. 14, the present working example is provided with: BIOS 600 as a specific example of initialization unit 100, Linux OS 800 as a specific example of control unit 300, physical memory 700 as a specific example of main memory unit 200, BIOS command (0x15) 601 as a specific example of main memory area information provision unit 101, setup function 801 as a specific example of main memory area information acquisition unit 301, biosmap information 802 as a specific example of main memory area information 302, pci_devices structure 803 as a specific example of initialization information list 303, pci_init function 804 as a specific example of device driver initialization function 304, and pci_enable_device function 805 as a specific example of device recognition unit 305. The other constituent elements are equivalent to those of the second exemplary embodiment and are therefore given the same reference numbers as in FIG. 6 and redundant explanation is here omitted.

A BIOS command is a command for using various services that are provided by BIOS 600. Setting the numerical values that are designated in the CPU register and accessing BIOS commands enables, for example, the acquisition of CPU speed information and the acquisition of about memory capacity of physical memory 700. One command of BIOS commands that is used in the present working example is BIOS command (0x15) 601 for acquiring physical address map (biosmap information 802) that is provided by BIOS 600.

"Biosmap information 802" is a record of position information of each area in physical memory 700 that is used by BIOS 600 during the device initialization process.

FIG. 15 shows a specific example of biosmap information 802. As shown in FIG. 15, biosmap information 802 is made up from three entries: the leading address, terminal address, and the method of use of the area for areas that each store information. In the present working example, initialization information storage unit 103 appends position information of initialization information storage area 201 to biosmap information 802, whereby device information application unit 306 is able to acquire position information of initialization information storage area 201 and specify the position of initialization information storage area 201 in main memory unit.

"Setup function 801" is a function for preparing an environment that is necessary for the execution of Linux OS 800. Using setup function 801, Linux OS 800 accesses BIOS command (0x15) 601 to acquire biosmap information 802. Linux OS 800 uses biosmap information 802 that is acquired as reference information when implementing control of physical memory 700.

Pci_devices structure 803 is the list of pci_dev structures 900 that stores initialization information 500 in the second exemplary embodiment. Similar to initialization information 500 in the second exemplary embodiment, pci_dev structure 900 that is stored in pci_devices structure 803 stores: device names (vendor ID and device ID), I/O port numbers, IRQ number, and other setting information specific to devices.

Pci_init function 804 is the function that is executed first when Linux OS 800 loads device driver 307 for pci devices that are connected using pci to the information processing device. By accessing pci_enable_device function 805, pci_init function 804 implements the pci device initialization process.

pci_enable_device function 805 is a function for carrying out the process for initializing pci devices and making the pci devices effective.

In the present working example, upon being accessed by pci_init function 804, pci_enable_device function 805 first checks the connection state of the specific device to which it corresponds, acquires the device name of the specific device, and then, before carrying out the device recognition process, accesses device information application unit 306 to determine whether a device name contained in device information 400 acquired from initialization information storage area 201 matches the acquired specific device name.

Figure 16:
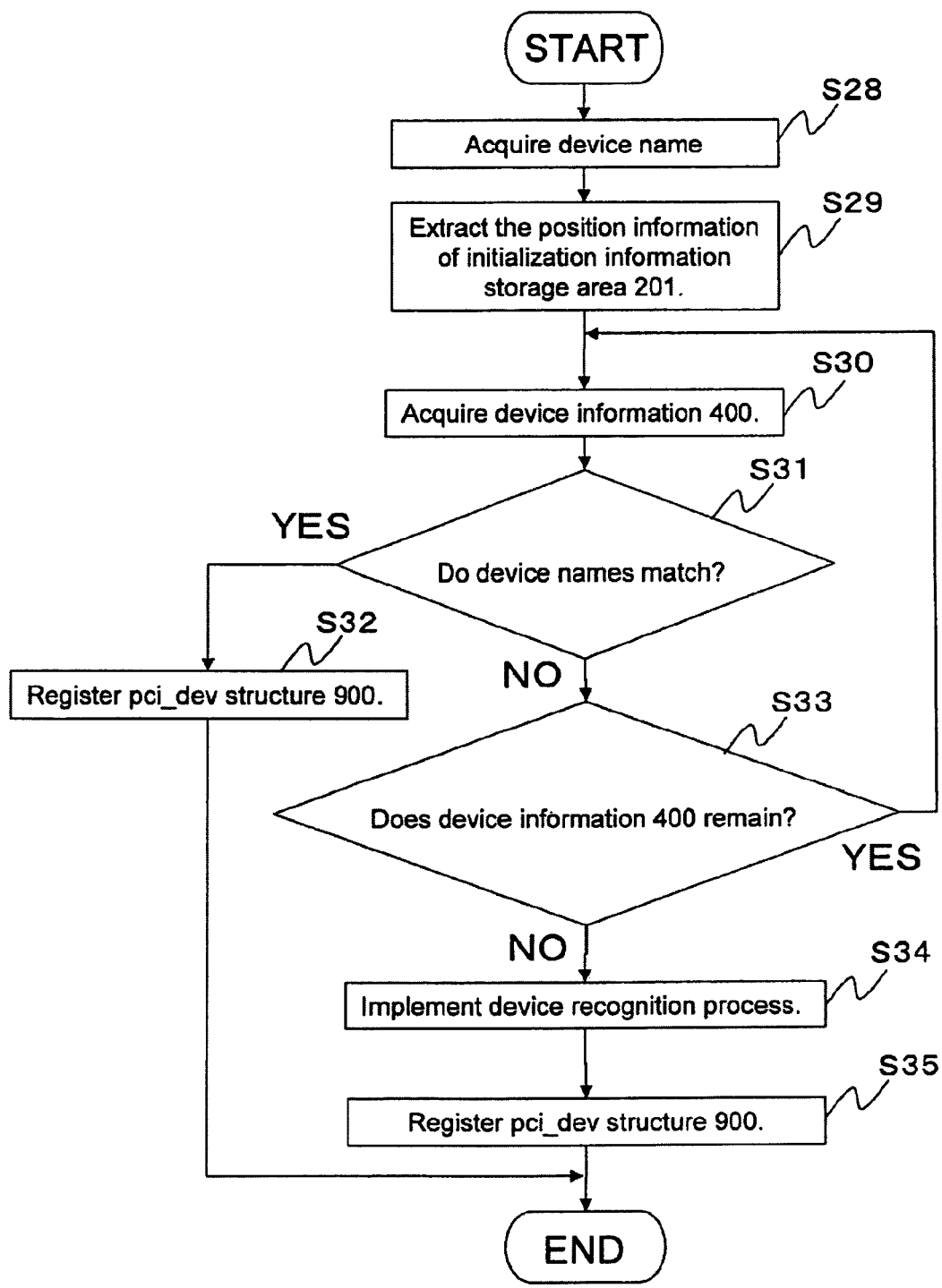
FIG. 16 is a flow chart for explaining the operations of the device initialization process in the Linux OS shown in FIG. 14.

Explanation next regards the operations of the present working example with reference to the flow chart of FIG. 16.

The operations of each unit in BIOS 600 are equivalent to the operations of each corresponding unit of initialization unit 100 that is realized by the execution of firmware in the second exemplary embodiment shown in FIG. 8, and redundant explanation is therefore here omitted.

The flow chart of FIG. 16 shows the operations of each unit of Linux OS 800. These operations are executed by BIOS 600 loading Linux OS 800 in physical memory 700 after the device initialization process is carried out by BIOS 600 and are started when Linux OS 800 executes pci_init function 804 through device driver 307.

Linux OS 800 first loads device driver 307 to access pci_enable_device function 805.

Upon being accessed, pci_enable_device function 805 first checks the connection state of the pci devices that are connected to the information processing device by using pci, acquires information such as the vendor ID or device ID from the pci devices, and stores the information in pci_dev structure 900 in S28.

Here, the vendor ID is a unique identifier that is provided to the company that created the device. The device ID is a unique identifier that is provided to each of the devices produced by a particular vendor.

This vendor ID and device ID are essentially used as a device name. In the present working example, it is also assumed that the vendor ID and device ID are used as a device name.

Next, pci_enable_device function 805 accesses device information application unit 306.

Device information application unit 306 then extracts position information of initialization information storage area 201 from biosmap information 802 in S29.

Device information application unit 306 next uses the position information of initialization information storage area 201 that has been extracted to specify the position of initialization information storage area 201 in physical memory 700, and acquires device information 400 from initialization information storage area 201 in S30.

Device information application unit 306 then determines whether the device name of the pci device that was acquired by pci_enable_device function 805 matches a device name contained in device information 400 in S31.

If the device name matches (YES in S31), device information application unit 306 uses device information 400 that has been acquired to store the information that is necessary in pci_dev structure 900 and registers pci_dev structure 900 in pci_devices structure 803 in S32.

However, when the device name does not match (NO in S31), device information application unit 306 determines whether other device information remains in initialization information storage area 201 in S33.

If other device information 400 remains (YES in S33), device information application unit 306 acquires other device information 400 from initialization information storage area 201 and repeats the determination of whether the device name of the specific device matches a device name contained in the other device information 400.

If other device information 400 does not remain in initialization information storage area 201 (NO in S33), device information application unit 306 completes the process and accesses pci_enable_device function 805.

Next, pci_enable_device function 805 sets the device control information by carrying out the device recognition process for recognizing the pci device in S34, stores information that includes the device control information and device name of the pci device in pci_dev structure 900, and registers information that includes the device control information and device name in pci_devices structure 803 in S35.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing device comprising: an initialization unit that is realized by execution of firmware for carrying out a first initialization process for enabling access from said firmware to devices that are connected to said information processing device; a control unit that is realized by execution of an operating system for, after execution of said firmware, carrying out a second initialization process for enabling access to said devices from said operating system; and a main memory unit; wherein:

said initialization unit comprises:
 a device initialization unit for, in said first initialization process, setting device control information that is necessary for accessing a device that is the object of the first initialization process; and
 an initialization information storage unit for storing in said main memory unit initialization information that includes said device control information that was set by said device initialization unit;

said control unit comprises:
 a device information application unit for, in said second initialization process, acquiring from said main memory unit initialization information of a device that is the object of said second initialization process;

said device initialization unit, in said first initialization process, acquires the device name of a device that is the object of said first initialization process;

said initialization information storage unit appends the device name that was acquired by said device initialization unit to said initialization information and stores said device name in said main memory unit;

said control unit further comprises a device recognition unit for, in said second initialization process, acquiring the device name of a device that is the object of said second initialization process;

said device information application unit, when the device name acquired by said device recognition unit matches a device name contained in said initialization information that was acquired from said main memory unit, registers the initialization information in an initialization information list as the initialization information of the device that is the object of said second initialization process; and when the device name acquired by said device recognition unit does not match a device name contained in said initialization information acquired from said main memory unit in said second initialization process, said device recognition unit sets said device control information of the device that is the object of said second initialization process and registers initialization information that includes the device name of the device and said device control information in said initialization information list.

2. The information processing device according to claim 1, wherein:

said control unit further comprises a device initialization determination unit for, in said second initialization process, determining whether the device name of the device that is the object of said second initialization process is recorded in a device non-initialization determination list in which are recorded device names of devices for which said initialization information is not acquired from said main memory unit; and said device recognition unit, when the device name of a device that is the object of said second initialization process is recorded in said device non-initialization determination list, sets said device control information of said device and registers initialization information that includes the device name of the device and said device control information in said initialization information list.

3. The information processing device according to claim 2, wherein, when the device name of the device that is the object of the second initialization process is not recorded in said device non-initialization determination list in said second initialization process, said device information application unit acquires initialization information of the device from said main memory area.

4. The information processing device according to claim 3, wherein:

said main memory unit includes an initialization information storage area for storing said initialization information;

said initialization information storage area both stores said initialization information in said initialization information storage area and stores position information of said initialization information storage area as main memory area information that is position information of each area in said main memory unit;

said initialization unit further includes a main memory area information provision unit for providing said main memory area information to said control unit;

said control unit further includes a main memory area information acquisition unit for acquiring said main memory area information that is provided by said main memory area information provision unit; and said device information application unit extracts position information of said initialization information storage area from said main memory area information that was acquired by said main memory area information acquisition unit, uses position information that was extracted to specify positions of said initialization information storage area in said main memory unit; and acquires said initialization information from said initialization information storage area for which positions were specified.

5. A device initialization method that is carried out by an information processing device that includes: an initialization unit that is realized by execution of firmware for carrying out a first initialization process for enabling access from said firmware to devices that are connected to said information processing device; a control unit that is realized by execution of an operating system for, after execution of said firmware, carrying out a second initialization process for enabling access to said devices from said operating system; and a main memory unit; said method comprising:
   a first device initialization step that is performed by means of said initialization unit in said first initialization process of setting device control information that is necessary for accessing a device that is the object of said first initialization process; and
   a storage step that is performed by means of said initialization unit of storing in said main memory unit initialization information that includes said device control information that was set in said first device initialization step;
   a second device initialization step that is performed by means of said control unit in said second initialization process for acquiring from said main memory unit initialization information of a device that is the object of said second initialization process;
   in said first device initialization step, acquiring the device name of a device that is the object of said first initialization process;
   in said storage step, appending the device name acquired in said first device initialization step to said initialization information and storing said device name in said main memory unit;
   in said second initialization process, a device name acquisition step of acquiring the device name of a device that is the object of said second initialization process by said control unit;
   in said second device initialization step, when the device name acquired in said device name acquisition step matches a device name contained in said initialization information that was acquired from said main memory unit, registering the initialization information in an initialization information list as the initialization information of the device that is the object of said second initialization process; and
   in said second device initialization step, when the device name acquired in said device name acquisition step does not match a device name contained in said initialization information acquired from said main memory unit, setting said device control information of the device that is the object of said second initialization process and registering initialization information that contains the device name of the device and said device control information in said initialization information list.

6. The device initialization method according to claim 5, further comprising:
   a device initialization determination step in said second initialization process for determining by means of said control unit whether the device name of a device that is the object of said second initialization process is recorded in a device non-initialization determination list that records device names of devices for which said initialization information is not acquired from said main memory unit; and
   a normal initialization step in said device initialization determination step for, by means of said control unit, when the device name of the device that is the object of said second initialization process is recorded in said device non-initialization determination list, setting said device control information of the device and registering initialization information that includes the device name of the device and said device control information in said initialization information list.

7. The device initialization method according to claim 6, wherein, in said device initialization determination step, said second device initialization step is carried out when the device name of a device that is the object of said second initialization process is not recorded in said device non-initialization determination list.

8. The device initialization method according to claim 7, further comprising:
   in said storage step, a step of both storing said initialization information in the initialization information storage area in said main memory unit and storing position information of the initialization information storage area as main memory area information that is position information of each area in said main memory unit; and
   in said second initialization process, a main memory area information acquisition step of acquiring said main memory area information from said initialization unit by said control unit; and
   in said second device initialization step, extracting position information of said initialization information storage area from said main memory area information that was acquired in said main memory area information acquisition step, using extracted position information to specify the position of said initialization information storage area in said main memory unit, and acquiring said initialization information from said initialization information storage area for which said position was specified.

* * * * *